Dec. 4, 1962 L. D. THOSTENSON 3,066,546
PULLEY TRANSMISSION
Filed June 1, 1961

INVENTOR
LEWIS D. THOSTENSON
BY HIS ATTORNEYS
HARRIS, KIECH, RUSSELL & KERN

United States Patent Office

3,066,546
Patented Dec. 4, 1962

3,066,546
PULLEY TRANSMISSION
Lewis D. Thostenson, San Diego, Calif., assignor to Salsbury Corporation, Los Angeles, Calif., a corporation of California
Filed June 1, 1961, Ser. No. 114,084
4 Claims. (Cl. 74—230.17)

This invention relates to variable effective diameter pulleys and more particularly is concerned with a pulley of an improved design which provides for positive displacement of the pulley belt away from a movable flange of the pulley when the pulley operates below a predetermined running speed.

Variable effective diameter pulleys are commonly employed in variable speed power transmissions. The change in effective pulley diameter is usually obtained through cooperation of a first flange and an axially shiftable or movable flange, both flanges being generally of a frusto-conical shape and being carried by a rotatable shaft. V-type pulley belts are used with variable effective diameter pulleys. The V-belt at running speeds is edge driven with the belt being clamped at its side edges between the two flanges of the pulley. When the pulley is operating at a speed below a predetermined r.p.m., it is desirable that the movable flange of the pulley be completely out of engagement with the edge of the belt. The structure of the improved variable effective diameter pulley of the invention effectively moves the movable flange away from the pulley belt at reduced speeds.

The variable effective diameter pulley of the invention comprises a first pulley flange mounted on a rotatable shaft spaced from a second movable pulley flange having an elongated hub which is slidably disposed on the shaft. There is no direct connection means between the movable pulley and the shaft by which means torque may be transmitted. The hub of the movable pulley extends away from the first pulley flange and is provided with a slot. A drive member is affixed to the rotatable shaft at a site adjoining the hub of the movable flange. The drive member supports a centrifugal device which includes a two-arm bell crank pivoted to the drive member. The first arm of the bell crank has a weighted outer end. The free end of the second arm of the bell crank is located in the aforementioned slot in the hub of the movable pulley flange. Movement of the second arm of the bell crank moves the movable second flange axially of the rotatable shaft. The second arm also serves to transmit radial torque between the rotatable shaft and the movable flange, there being no direct connection between the latter two components of the pulley device. Resilient means are provided opposing the outward movement of the centrifugal device. The centrifugal device with rotation of the shaft exerts a force on the movable, second flange urging the flange away from the first pulley flange. Normally the resilient means takes the form of an extension spring or springs which are associated with the centrifugal device.

In a preferred embodiment of the device of the invention, the drive member which is fixed to the rotatable shaft has at least three bell cranks pivoted thereto, and the hub of the movable second pulley flange is provided with a corresponding number of slots adapted to receive the free ends of the respective second arms of the several bell cranks. In this latter embodiment, an extension spring is connected between the first arms of adjoining bell cranks.

Other objects and advantages of the invention will become more apparent from a study of the following specification and the accompanying drawing, which is for the purpose of illustration only, and in which.

Figure 1:
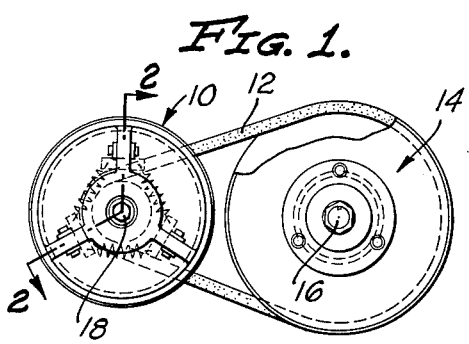
FIG. 1 is a side view, partially cut away, illustrating a preferred embodiment of the variable effective diameter pulley of the invention connected through a V-pulley belt to a second pulley.
Figure 2:
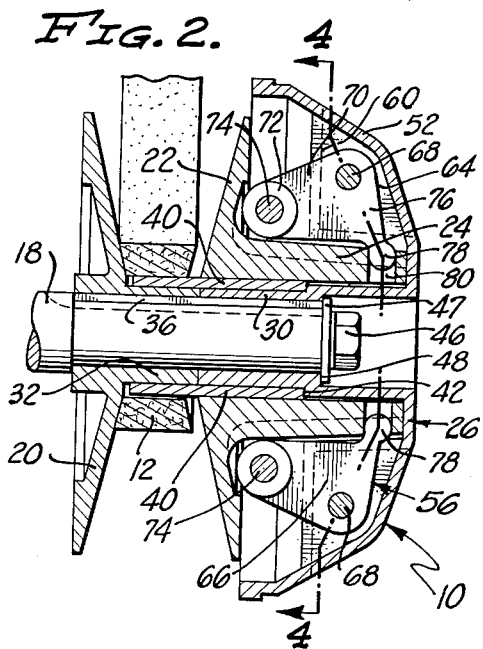
FIG. 2 is a cross-sectional view of the variable effective diameter pulley of FIG. 1 taken along line 2—2 of that figure and illustrating the device with a movable flange of the pulley out of engagement with the V-belt.
Figure 3:
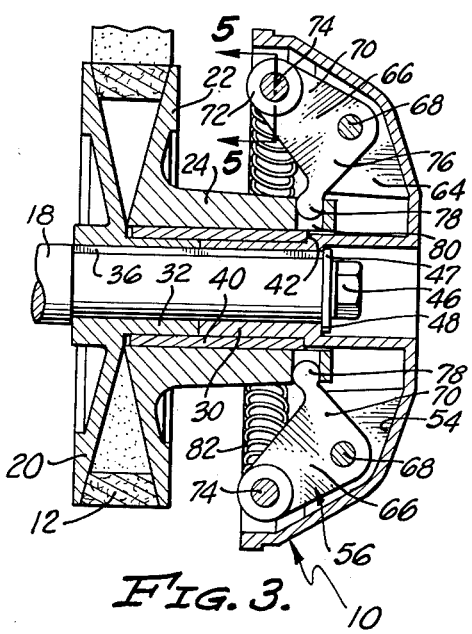
FIG. 3 is a sectional view also taken along the line 2—2 of FIG. 1, illustrating the movable flange of the variable effective diameter pulley in engagement with the V-belt.

With reference to FIG. 1, there is illustrated a pulley arrangement including a variable effective diameter pulley 10 connected through a V-belt 12 to a larger second pulley 14 mounted on a shaft 16. The variable effective diameter pulley 10 is carried by a rotatable shaft 18 and, as best seen in FIGS. 2 and 3, includes a fixed flange 20, a second movable flange 22 spaced from the fixed flange 20 with the V-belt 12 therebetween. The movable flange 22 has an elongated hub 24 which extends away from the first fixed flange 20. The structure of the variable effective diameter pulley 10 includes a drive plate member 26 having an elongated hub 30, the bore of which engages the rotatable shaft 18. The first fixed flange 20 has a tubular boss 32 which encircles the rotatable shaft 18 and which abuts the end of the hub 30 of the drive plate member 26. The boss 32 of the fixed flange and the hub 30 of the drive plate member 26 are fixed to the rotatable shaft through a key 36. The boss 32 and the hub 30 at their adjoining ends have a small wall thickness and are enclosed in an elongated cylindrical bushing 40.

Reference to FIG. 2 will show that the hub 24 of the movable flange 22 slidably engages the outer surface of the bushing 40. The hub 30 of the drive plate member 26 has an outset shoulder 42 intermediate its length against which one end of the elongated bushing 40 fits. Tightening of a cap screw 46 into a threaded end of the rotatable shaft 18 brings a washer 47 into contact with an inset shoulder 48 of the hub 30 of the drive plate member 26, serving to hold the device in assembled form.

Figure 4:
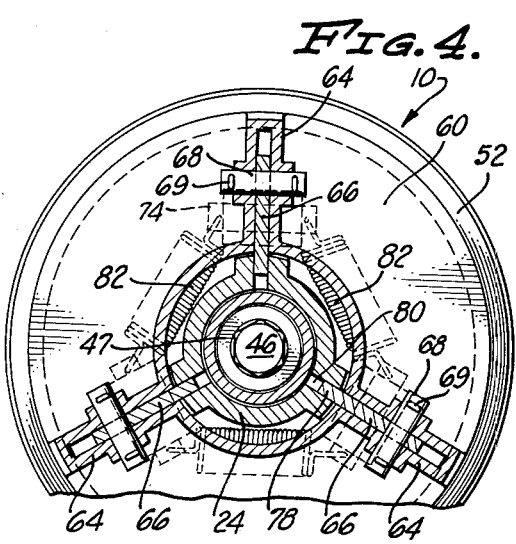
FIG. 4 is a fragmentary sectional view taken along line 4—4 of FIG. 2.

The drive plate member 26 has an outer rim 52 of an irregular conical outline (see FIGS. 2 and 3) which defines a shell 54 in which there is housed a centrifugal device 56. The drive plate member 26 has an annular wall 60 (FIG. 4) spaced intermediately of the length of the plate member. The annular wall 60 has a central opening and at its outer edge is integral with the rim 52. The drive plate member has three spaced ribs 64 extending between the annular wall 60 and the outer rim 52. As best seen in FIG. 4, each of the three ribs 64 is hollow and contains within its cavity a pivoted bell crank 66. Each bell crank 66 is pivotally supported by a pin 68 extending through the opposite walls of the rib 64. Cotter pins 69 or other suitable securing means are located at the opposite ends of the pins 68 to retain them in position. Each bell crank 66 has a first arm 70 which carries at its outer end a weight 72 (FIGS. 2 and 3), the weight being held to the bell crank through a suitable pin 74. The second arm 76 of each bell crank 66 at its outer end has an integrally formed ball 78. Each ball 78, as best seen in FIGS. 2 and 3 is contained in a slot 80 formed in the outer end of the hub 24 of the movable flange 22. It will be appreciated that outward movement of the weighted end of the first arm 70 of the bell crank 66 causes the ball 78 of the second arm 76 to move, bringing about axial movement of the movable flange 22 towards the fixed flange 20 (see FIG. 3). It will be appreciated that the ball 78 of each bell crank 66 seats in a separate slot 80 of the hub 24 of the movable flange 22.

Figure 5:
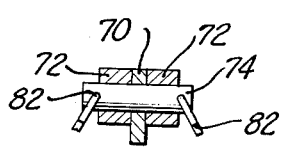
FIG. 5 is a detailed fragmentary sectional view taken along line 5—5 of FIG. 3.

As best seen in FIGS. 3 and 4, extension springs 82 are employed to connect the weighted outer ends of the first arms 70 of the bell cranks 66 together. More particularly, the extension springs 82 are connected to the outer ends of the pins 74 (FIG. 5) which are employed to hold the weights 72 to the outer ends of the first arms 70 of the three bell cranks 66. It will be appreciated that outward movement of the weights 72 of the bell cranks 66 is opposed by the extension springs 82. When the speed of the variable speed pulley drops below a predetermined r.p.m. the extension springs 82 pull the crank arms 66 into the position illustrated in FIG. 2 with the result that the movable pulley flange 22 is moved completely out of engagement with the V-belt 12. With increased speed the weights 72 of the crank arms 66 move outwardly towards the position illustrated in FIG. 3 and the movable flange 22 once again engages the edge of the V-belt 12.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. In a variable effective diameter pulley, the combination comprising:
   a rotatable shaft;
   a first pulley flange mounted on said shaft;
   a second movable pulley flange having an elongated hub slidably disposed on said rotatable shaft and connected indirectly thereto, said hub extending away from the first pulley flange and being provided with a slot;
   a drive member affixed to the rotatable shaft at a site adjoining the hub of the second movable pulley flange;
   a centrifugal device mounted on said drive member, said device including a bell crank pivoted to the drive member and having two arms, with the first arm having a weighted outer end and with the free end of the second arm terminating in the slot of the hub of the second pulley flange to provide connection between the rotatable shaft and the second pulley flange, said second arm with movement of the bell crank bringing about movement of the second pulley flange axially of the rotatble shaft, said second arm also serving to transmit radial torque between the rotatable shaft and the second pulley flange; and
   a resilient means opposing the outward movement of the centrifugal device and adapted to exert a force on said second pulley flange urging said flange away from the first pulley flange.

2. A variable effective diameter pulley in accordance with claim 1 wherein the resilient means comprises an extension spring associated with the centrifugal device, said extension spring opposing the outward movement of the weighted outer end of the first arm of the bell crank.

3. A variable effective diameter pulley in accordance with claim 2 wherein the drive member has at least three bell cranks pivoted thereto, and the hub of the second pulley flange has a corresponding number of slots for receiving the free ends of the respective second arms of said bell cranks and wherein an extension spring is connected between the bell cranks of each adjoining pair with the opposite ends of the respective extension springs being connected to the first arms adjacent the weighted outer ends.

4. A variable effective diameter pulley in accordance with claim 1 wherein the weighted outer end of the first arm of the bell crank comprises a weighted member that is removably held to said first arm.

References Cited in the file of this patent

UNITED STATES PATENTS

| 2,651,210 | Clark | Sept. 8, 1953 |
| 2,795,962 | Uher | June 18, 1957 |

FOREIGN PATENTS

| 200,016 | Austria | Oct. 10, 1958 |